United States Patent [19]
Dorn

[11] Patent Number: 5,894,417
[45] Date of Patent: Apr. 13, 1999

[54] METHOD AND SYSTEM FOR HORIZON INTERPRETATION OF SEISMIC SURVEYS USING SURFACE DRAPING

[75] Inventor: Geoffrey A. Dorn, Plano, Tex.

[73] Assignee: Atlantic Richfield Company, Los Angeles, Calif.

[21] Appl. No.: 08/716,110

[22] Filed: Sep. 19, 1996

[51] Int. Cl.$^6$ .................................................. G06F 19/00
[52] U.S. Cl. ............................ 364/421; 702/16; 702/17
[58] Field of Search .................................... 364/421, 422; 367/72, 71, 52, 53, 51, 50, 47

[56] References Cited

U.S. PATENT DOCUMENTS

| | | | |
|---|---|---|---|
| 4,357,660 | 11/1982 | Hepp | 364/422 |
| 4,359,766 | 11/1982 | Waters et al. | 364/421 |
| 4,467,461 | 8/1984 | Rice | 367/71 |
| 4,672,545 | 6/1987 | Lin et al. | 364/421 |
| 4,870,580 | 9/1989 | Lang et al. | 364/421 |
| 5,056,066 | 10/1991 | Howard | 364/421 |
| 5,079,703 | 1/1992 | Mosher et al. | 364/421 |
| 5,537,365 | 7/1996 | Sitoh | 364/421 |

OTHER PUBLICATIONS

Stark, "Surface slices: Interpretation using surface segments instead of line segments", *Expanded Abstracts of the 1991 Society of Exploration Geophysicists Annual Meeting*, Paper CH5.1, pp. 259–262.

Stark, "Surface slice generation and interpretation: A review", *The Leading Edge*, vol. 15, No. 7 (Jul. 1996), pp. 818–819.

*Primary Examiner*—Donald E. McElheny, Jr.
*Attorney, Agent, or Firm*—Anderson, Levine & Lintel

[57] ABSTRACT

A computer system for interpreting seismic signals to identify reflective horizons is disclosed. The seismic signals are retrieved and conventional corrections are applied. A seismic survey is displayed, and a human analyst places horizon lines or surfaces above or below suspected reflective events in the survey. The disclosed method then operates on a trace by trace basis to identify the location in time at which the attribute, which may be amplitude, envelope amplitude, phase, frequency and the like, meets a draping criterion. The interpreted horizon is set at the identified depth or time location, and the interpreted horizon points are connected into an interpreted horizon surface (in the case of a 3-D survey). Traces having only weak or no reflections may not have an interpreted surface point, or may have an interpolated point set therefor. An automated and efficient horizon interpretation method and system, even for large surveys of complex geology, is thus provided.

19 Claims, 7 Drawing Sheets
(2 of 7 Drawings Sheet(s) Filed in Color)

METHOD AND SYSTEM FOR HORIZON INTERPRETATION OF SEISMIC SURVEYS USING SURFACE DRAPING

This invention is in the field of seismic prospecting for oil and gas reservoirs, and is more specifically directed to the analysis of seismic signals indicative of subsurface geological interfaces and structures.

BACKGROUND OF THE INVENTION

The use of seismic surveys, such as those obtained through vibratory surveys of subsurface geology, is fundamental in the prospecting for oil and gas reservoirs. As, known in the art, conventional seismic surveys of both the marine and land-based variety are based upon signals detected by arrays of receivers in response to many seismic "shots" imparted to the earth in the survey area. Dramatic improvements in the data acquisition and data processing technologies over recent years have made the generation of three-dimensional seismic surveys commonplace in the art, and have greatly improved the sensitivity and resolution of the surveys. These improvements have been necessitated by the inherent difficulty in finding those reservoirs of the world that have not been previously exploited.

After recording and storage of the detected seismic signals, conventional seismic signal processing techniques process and spatially arrange the data into a survey of the subsurface geology. Conventional techniques such as normal moveout, migration to correct for dip and diffraction effects, and noise filtering, are first applied to the seismic signals to remove known sources of error. Spatial arrangement of the corrected signals, using conventional techniques such as common midpoint gathers and stacks, generation of amplitude-versus-offset ("AVO") indicators, and the like, is then performed to result in a seismic survey (either two- or three-dimensional in nature) indicative of the subsurface geology in the survey region. Modern computing systems enable the handling of large volumes of signal data in the generation of these surveys, and also enable the human analyst to view three-dimensional surveys along any orientation.

After the seismic survey has been acquired, processed, and generated, the survey must be interpreted in order to fully understand the geology represented by the signal data. This interpretation, which is typically performed by a skilled analyst, generally includes the digitization of horizon surfaces within the three-dimensional survey volume. Horizon surfaces are surfaces that are selected, or numerically interpreted, to coincide with reflections in the volume represented by the seismic survey. The digitization of horizon surfaces can thus be considered to convert an arrangement of time-domain seismic signals into a graphic representation of the subsurface geology, in two or three dimensions. The depth, size, and locations of interfaces between geological formations can be deduced from such a representation, and used in guiding exploratory and production drilling, and in defining new survey techniques and arrangements. Of course, the accuracy with which the horizon surfaces are digitized or interpreted is critical in the success of such activities.

A first conventional method for interpretation of horizons from the seismic survey is commonly referred to in the art as direct manual picking. According to this approach, a planar "slice" in the three-dimensional survey volume is selected by the interpreter and is displayed, generally on an interactive computer system but also possibly by way of printed output (in more primitive systems). While the slice is typically made along one of the three orthogonal axes in the volume of line, crossline, and time, a slice may also be made along traverses not aligned with any one axis. In direct manual picking, the human analyst merely selects the location of horizon surfaces using his or her judgment, based upon the seismic signals themselves, and indicates the selection by activating a pointing device (mouse, trackball, etc.). While direct manual picking may be quite accurate when done by an experienced analyst, the sheer volume of seismic data in conventional three-dimensional surveys makes such an approach extremely slow, time-consuming, and costly.

By way of further background, an operation commonly referred to as "snapping" is conventionally applied to manually picked interpreted horizons. As is known in the art, hand-picked horizons are generally not precisely located on reflection events because of manual picking errors. The snapping operation is performed by moving the horizon along each trace from the initial manually picked position to a local maximum amplitude (or minimum amplitude, or zero crossing, as desired), thus adjusting the horizon to precisely match the reflection event being interpreted.

A conventional semi-automated approach to horizon interpretation is commonly referred to as autotracking, or volume autotracking. According to this technique, slices are again made in the seismic survey volume, and displayed by the computer system. The human interpreter selects "seed" points which he or she considers to be at a horizon surface, but need not pick an entire surface. After such selection, the computer system begins to extend horizon surfaces from the seed points, based on a selected algorithm and according to the seismic signals at neighboring locations, resulting in a connected surface extrapolation of the horizon. Volume autotracking is generally most successful when applied to surveys of relatively smooth and well-behaved geology, however, due to its requirement that the horizon surfaces remain connected; discontinuities, faults, reflection event splitting, and other ambiguities in the geology present problems to conventional volume autotracking systems.

A third conventional approach to horizon interpretation is referred to in the art as surface-slice interpretation. This approach is described in Stark, "Surface slices: Interpretation using surface segments instead of line segments", *Expanded Abstracts of the* 1991 *Society of Exploration Geophysicists Annual Meeting*, and in Stark, "Surface slice generation and interpretation: A review", *The Leading Edge*, Vol. 15, No. 7 (July 1996), pp. 818–819. Surface-slice interpretation is an automated approach in which the analyst selects a thin slab of the seismic volume, for example at a selected depth or time, in which the automated computer system identifies potential reflective events. For example, seismic signal amplitudes above a certain threshold may be identified as reflective events. Reflective events are then similarly identified in the next incremental slab in time or depth, and are "joined" to those reflective events in the previous slice that can be considered as part of the same horizon. A set of surfaces are thus generated through the repetition of this process; for example, an anticline would appear as a set of concentric shells. The surface-slice interpretation system is often referred to as "2½-dimensional", due to its linking of events from two-dimensional slices. While the surface-slice interpretation approach is somewhat more efficient than the volume autotracking approach, this process can be time-consuming and difficult when the geologic structure is complex or when the seismic signal is weak. In addition, discontinuities and faults encountered in complex geology can also result in ambiguities when interpreted by the surface-slice method.

While the automated approaches of volume autotracking and surface-slice interpretation are quite efficient for certain geologies, each of these conventional techniques are quite slow in the interpretation of complex geologies, as, of course, is direct manual picking. In addition, conventional 3-D seismic surveys now generally involve huge volumes of data; for example, a typical modern survey may consist of on the order of 2000 shot lines, each shot line having 1500 traces per shot line, and each trace having 3000 time samples. As a result, these conventional manual or automated horizon interpretation techniques can be quite time-consuming, especially when applied to large surveys involving complex geologies. Since the prospecting for oil and gas reserves are now often concentrated in difficult and deep locations of the earth, considering that many of the shallow reservoirs have already been exploited and surveyed, there is an important need in the field for an efficient approach to horizon interpretation of seismic surveys.

It is therefore an object of the present invention to provide an automated system and method for performing horizon interpretation which can be efficiently applied to complex geological survey regions.

It is a further object of the present invention to provide such a system and method in which the human effort is efficiently applied to the interpretation process.

It is a further object of the present invention to provide such a system and method which performs the interpretation process in a robust manner when encountering discontinuities, faults, reflection event splitting (doublets), and other complexities in the surveyed geology.

It is a further object of the present invention to provide such a system and method which results in a full three-dimensional horizon interpretation when 3-D seismic data is available, but which is also applicable to 2-D seismic data, and to pre-stack seismic data.

It is a further object of the present invention to provide such a system and method which can readily handle large volumes of seismic data, such as those obtained from multiple 3-D surveys, either for adjacent regions or as repeat surveys.

Other objects and advantages of the present invention will be apparent to those of ordinary skill in the art having reference to the following specification together with its drawings.

SUMMARY OF THE INVENTION

The invention may be implemented into a computer system and method, applied to either prestack or poststack seismic survey signals to which normal moveout and other conventional corrections may have been applied. Through an interactive computer system, the human analyst places an initial surface over (or under) a possible horizon in the two-dimensional or three-dimensional survey. Starting from this initial surface, the system then iteratively analyzes seismic signal attributes, such as amplitude (reflection or envelope), frequency, phase and the like, individually or in combination, along each trace of the survey. The iterative analysis selects a point along the trace where the attributes correspond to a reflection event, for example at a local maximum of an attribute that exceeds a threshold value, which becomes a point along the interpreted horizon. In effect, the system operates by "draping" the initial surface to likely reflection events in the seismic signals. Discontinuities or "holes" in the signals may be handled by way of extrapolation or interpolation, or by simple nulling of the interpreted horizon surface, if no reflection events are detected within a certain time-domain range.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE PREFERRED EMBODIMENT

As will be evident from the following description, the present invention is applicable to seismic survey signals that are acquired in the conventional manner from either land-based or marine surveys. As is well known according to the art, seismic surveys may be of the two-dimensional (2-D) type, in which the seismic source is incrementally moved along a line that is parallel from a line of receivers, to obtain survey signals corresponding to a line of midpoints. Three-dimensional (3-D) surveys are also well known in the art, and are obtained through use of at least one array of receivers arranged in multiple parallel lines, with source energy imparted at varying locations and varying offsets from the arrays of receivers. The present invention, while applicable to 2-D surveys, is also applicable to, and is especially beneficial in connection with, 3-D seismic surveys. It is contemplated that those of ordinary skill in the art are familiar with conventional techniques of data acquisition in seismic surveys of the 2-D- and 3-D type, in both the marine and land environments.

Figure 1:
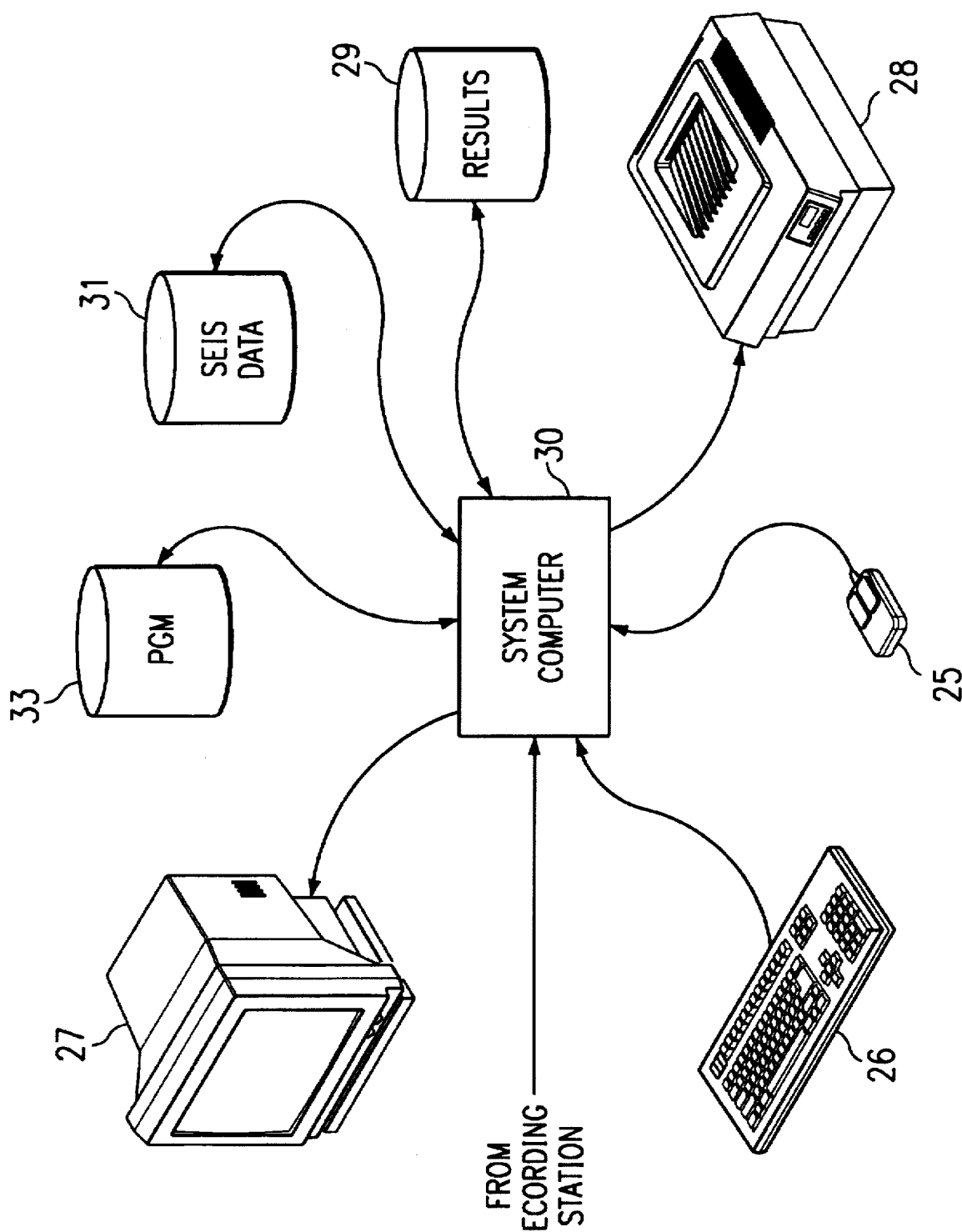
FIG. 1 is an electrical diagram, in block form, of a computer system into which the preferred embodiment of the invention is implemented.

Referring now to FIG. 1, a computer system into which the preferred embodiment of the invention may be implemented will be described. This system includes system computer 30, which may be implemented as any conventional personal computer or workstation implemented either in standalone fashion or as part of a network arrangement. System computer 30 is in communication with disk storage devices 29, 31, and 33, which are preferably external hard disk storage devices in a network. It is contemplated that disk storage devices 29, 31, 33 may be either directly connected to system computer 30, or indirectly accessible by way of a local area network or by remote access. Of course, while disk storage devices 29, 31, 33, are illustrated as separate devices, a single disk storage device may of course be used to store any and all of the program instructions, measurement data, and results as desired.

In this embodiment of the invention, seismic data from a recording station, such as may be in situ at the survey locations, are received by system computer 30 and, after conventional formatting and other initial processing, stored on disk storage device 31. System computer 30 will then retrieve the appropriate data from disk storage device 31 in order to perform horizon interpretation according to the method described hereinbelow. This operation by system computer 30 is controlled by a sequence of program instructions, written in the form of a computer program (e.g., in C++or in another suitable language) and stored in computer-readable memory, such as program disk storage device 33 of FIG. 1; of course, the memory medium storing the computer program may be of any conventional type used for the storage of computer programs, including hard disk drives, floppy disks, CD-ROMs and other optical media, magnetic tape, and the like.

According to the preferred embodiment of the invention, system computer 30 presents output primarily onto graphics display 27, or alternatively via printer 28; further in the alternative, system computer 30 may store the results of the analysis described hereinbelow on disk storage device 29, for use in further analysis. Keyboard 26 and pointing device (e.g., a mouse, trackball, or the like) 25 are provided with system computer 30 to enable interactive operation. As noted, system computer 30 is able to communicate with disk storage devices 29, 31, including external hard disk storage on a network and floppy disk drives. System computer 30 is typically located at a data center remote from the survey region.

According to the preferred embodiment of the invention, a method of operating the computer system of FIG. 1 to interpret horizons from seismic signals detected in a conventional seisnic survey, of either the 2-D or 3-D type and performed either in a marine or land-based setting, will now be described relative to FIG. 2.

The overall process of generating an interpreted seismic survey according to the preferred embodiment of the invention begins with process 32, in which the raw seismic survey signals are acquired from the field. As noted above and as fundamental in the art, the seismic survey signals acquired in process 32 may be from any type of conventional seismic survey in which energy is imparted into the earth at one or more locations and is detected at multiple locations after reflection from subsurface strata and interfaces. The source of the energy may be conventional surface or marine sources, generating vibratory sweep or impulse energy, or may be alternative sources such as the drill bit itself during the drilling of an exploratory or production well, according to the known vertical seismic profiling (VSP) technology. As the process according to the preferred embodiment of the invention is applicable to large 3-D surveys, the quantity of seismic signals obtained in process 32 may be quite large, corresponding to thousands of time samples from thousands of traces for thousands of shot lines. Of course, the present invention will also provide benefit in the interpretation of smaller surveys, including 2-D surveys.

Process 32 may be performed as a new survey, particularly if special survey information (e.g., compressional and shear wave response) is desired, in connection with which the present invention may be used to advantage. However, the process according to the preferred embodiment of the invention is also useful with conventional time-domain seismic surveys, and as such process 32 may merely correspond to previously gathered seismic survey signals (even for surveys performed years ago) that have been digitized and stored in a computer readable form. The potential for use of previously gathered seismic survey signals is indicated in FIG. 2 by the broken line following process 32.

In any case, the seismic survey signals acquired in process 32 are forwarded to system computer 30 and stored, in digital form, in its memory, such as disk storage device 31 as shown in FIG. 1. The method according to the preferred embodiment of the invention continues with process 34, in which seismic survey signals are retrieved from disk storage device 31 (or some other appropriate storage device) by system computer 30. The amount of data retrieved in process 34 is preferably that required to perform the processing steps described hereinbelow; of course, depending upon the volume of data contained within the survey, process 34 will generally not retrieve the entire survey at any one time, but will retrieve blocks of the survey data as useful and necessary in performing the operations described herein. In addition, it is contemplated that the human analyst may only wish to interpret a portion of a full survey, in which case only the operable portion of the survey will be retrieved in process 34.

Process 36 is next performed by system computer 30 upon the seismic signal data retrieved in process 34 to apply conventional corrections thereto. One well known correction applied in process 36 is normal move-out correction (NMO, or NMOC), which time-shifts the seismic signal data to account for source-receiver offset. Migration may also be performed in process 36 to account for error due to dip or diffraction. Other conventional correction and filtering, as desired, is also applied in process 36. As will be noted hereinbelow, certain filtering of the signals, particularly those that are performed on an individual trace basis, may be performed later.

Following the corrections of process 36, certain combining of the seismic signals may be performed, if desired, in process 38. The combining of process 38 depends upon the type of survey that is to eventually be interpreted. For example, the typical 3-D seismic survey, in which the orthogonal axes are x-position, y-position, and time or depth, is displayed with one trace for each x-y location, generated as the stack of multiple traces having a common midpoint. In this case, process 38 will select groups of traces having expected reflection events from the same midpoint (i.e., a common midpoint gather), and will sum these traces in the gather to form a single trace, generally with improved signal-to-noise ratio. A common variation on the conventional survey analyzes the amplitude of the envelope of the time-domain signal, rather than the amplitude of the signal itself, in which case process 38 will also include conversion of the time-domain signal into an envelope function.

Alternatively, if the seismic survey is being generated as an amplitude-versus-offset (AVO) survey, process 38 will derive AVO indicator traces for each x-y location, as a function of time or depth. For example, a conventional AVO process first determines AVO intercept values corresponding to the extrapolated zero-offset trace from a common midpoint gather, and determines AVO gradient values as corresponding to the amplitude rate of change with offset in the gather. An AVO indicator trace may then be generated by plotting the product of the AVO intercept and gradient values (either the real values, or complex conjugates) as a function of time.

Figure 2:
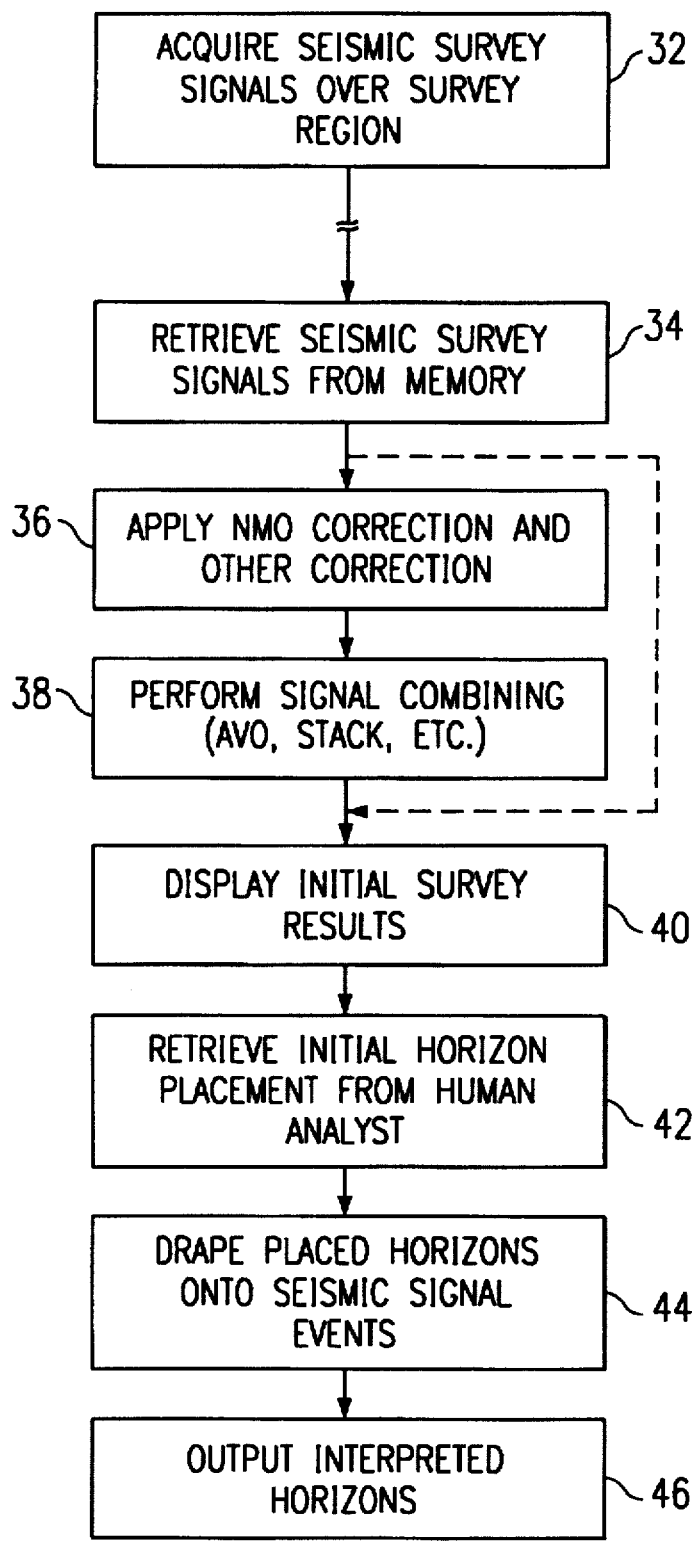
FIG. 2 is a flow chart of a method of performing horizon interpretation in a stacked data set according to the preferred embodiment of the invention.

In the event that prestack data is to be analyzed, however, combining process 38, and in certain cases correction process 36, are skipped, as illustrated by the dashed line in the flow chart of FIG. 2.

Process 40 is next performed by computer system 30, to display the initial survey to the human analyst. Typically, system computer 30 displays the survey, either in 2-D or 3-D form as desired, upon graphics display 27. System computer 30 is preferably interactively responsive to keyboard 26 and pointing device 25, enabling the human analyst to view the survey results in a selected plane, or in a 3-D perspective view if desired. In either case, each trace is associated with a surface location, and extends in a depth dimension; the depth dimension may be the time dimension for time-domain signals, or may be presented as depth when velocity information is applied to the timedomain signals.

Once the survey is displayed on graphics display 27, system computer 30 receives inputs from the human analyst corresponding to the locations of initial surface placement in the survey, as shown in FIG. 2 by process 42. These inputs are preferably presented to system computer 30 by the human analyst "pointing and clicking" at selected locations in the survey displayed in process 40 on graphics display 27. Of course, other input techniques may also be used to convey and receive the location of the initial surfaces in process 42. In any event, each initial surface is preferably placed in process 42 at locations of the survey that are either above or below potential reflective horizons, to allow subsequent processing to readily identify the horizons in the survey, as will be described hereinbelow. By way of definition for this description, horizon surfaces determined through the operation of the method of the preferred embodiment of the invention described hereinbelow will be referred to as "interpreted" horizon surfaces.

Figure 3A:
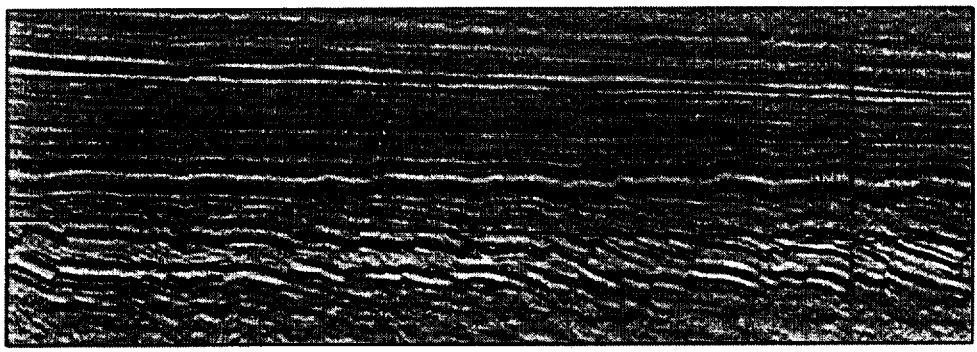
FIGS. 3a and 3b are cross-sectional 2-D views of a seismic survey, respectively illustrating the initial placement of a surface and its draping to a reflection horizon according to the preferred embodiment of the invention.

FIG. 3a illustrates an example of the placement of an initial surface as performed in process 42. The survey example of FIG. 3a is shown in 2-D form, for clarity of description. The survey section of FIG. 3a corresponds to a conventional signal amplitude versus time survey for a series of poststack common midpoint gather traces, with each trace thus corresponding to the sum of the prestack traces of the gather and placed in a survey at an x-position overlying the midpoints represented therein. As illustrated in FIG. 3a, the initial surface is entered by way of the human analyst identifying points along the surface by activation of mouse 25 or another pointing device. Preferably, the identified points may be spaced apart from one another along the x-axis (in this example) and need not be identified for each trace; system computer 30 will connect the identified points, for example in a piecewise linear fashion, to construct a contiguous initial horizon line HL (which corresponds to a surface in the 2-D survey). For a given initial surface, the identified points will typically not be at the same time or depth value, as shown in FIG. 3a. As noted above, the initial surface is placed along the traces at locations either above or below a suspected reflective horizon; in the example of FIG. 3a, the initial line HL is placed above a suspected actual horizon.

When applied to a 3-D survey, the initial surface placement of process 42 will be similarly be entered, but in a three-dimensional manner. This is preferably done by the human analyst similarly entering points on two-dimensional planes or, in the case of three-dimensional volume displays, within intersecting two-dimensional planes, with system computer 30 linking the points into a contiguous surface. Preferably, system computer 30 indicates, in each 2-D section, the location of previously entered initial surfaces that intersect that section, treating such points as points within the current section.

Figure 4A:
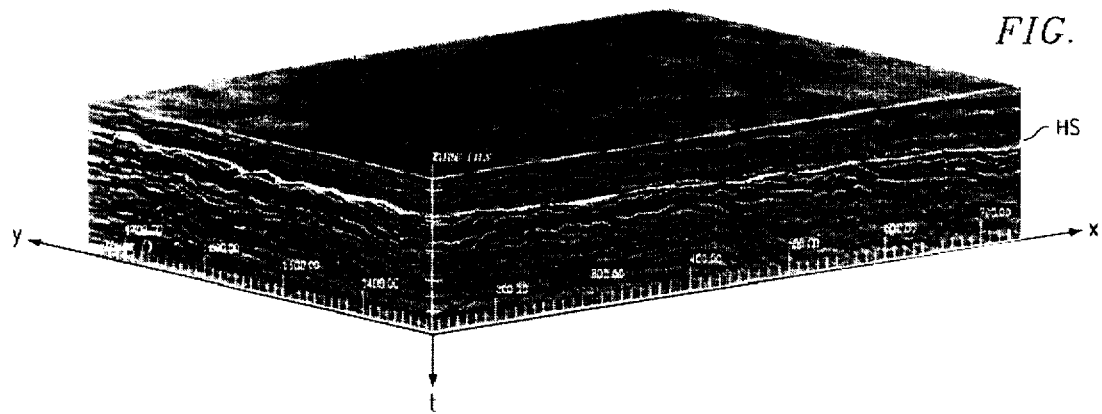
FIGS. 4a and 4b are perspective view seismic surveys respectively illustrating the initial placement of a horizon and the results of its draping according to the preferred embodiment of the invention.

Once the initial surface placement has been made, in the 3-D survey case, system computer 30 is operable to connect the initial surfaces HL into a placed three-dimensional surface. This is preferably done by interpolation among the various initial surfaces HL in the intersecting planes. FIG. 4a illustrates, in color, the location of a initial surface HS in a 3-D seismic survey (shown in white), where the x-axis corresponds to the line axis and the y-axis corresponds to the crossline axis. In FIG. 4a, the red locations indicate the locations of significant positive amplitude seismic signals.

Process 42 preferably is repeated so that additional initial surfaces are placed in the survey, varying in time or depth from one another, considering that multiple reflecting surfaces may be detectable in the survey. This repetition may be done in the same planes as the first placed surface, and if so may be done at the same time as the first surface is placed, for efficiency. If such is the case, system computer 30 preferably codes each surface line placed in each plane with an identifier, so that the interpolation of initial surfaces among the multiple planes may be performed unambiguously.

Figure 5:
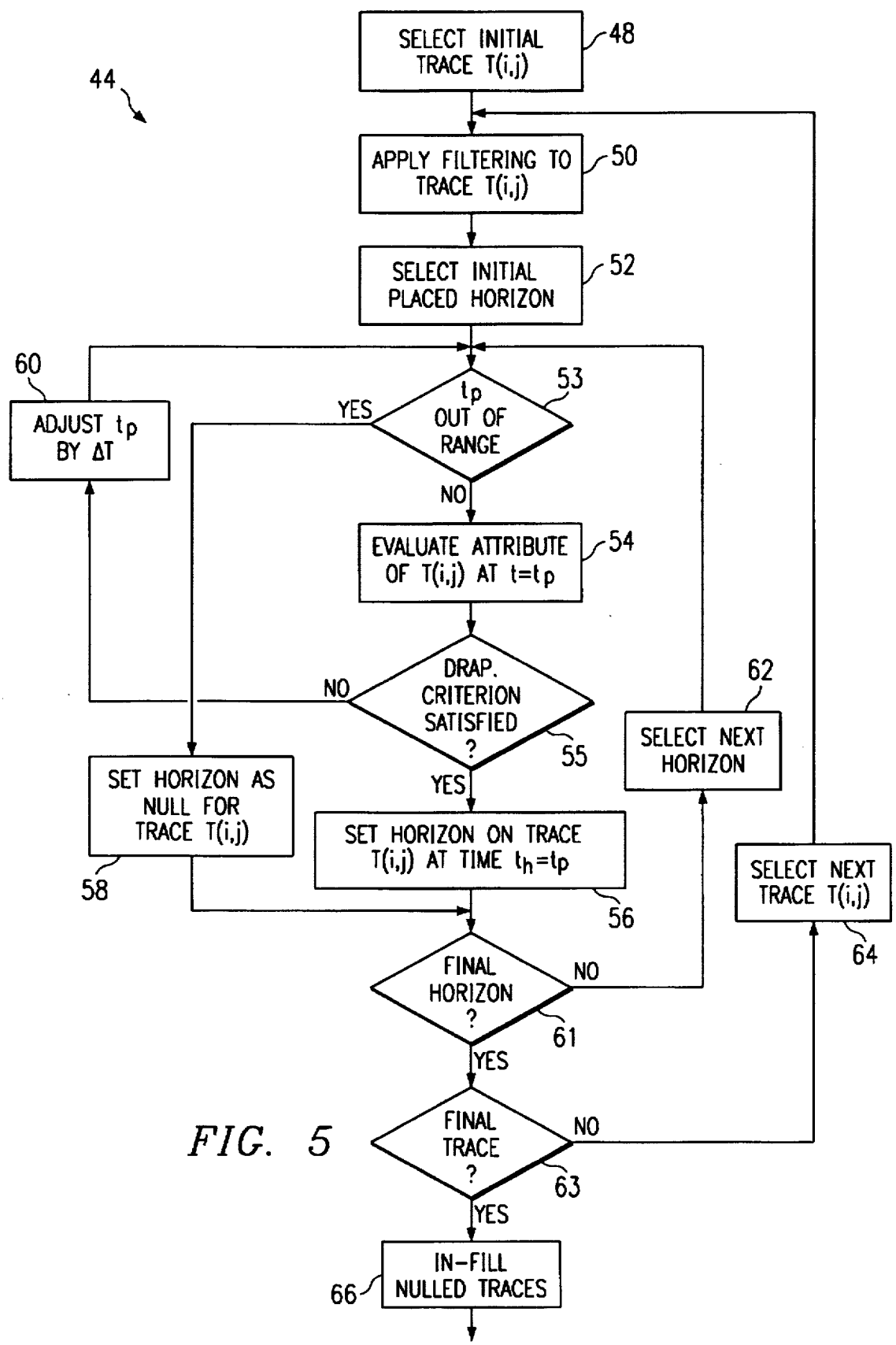
FIG. 5 is a flow chart illustrating detailed steps in the draping process according to the preferred embodiment of the invention.

Once the initial surface placement of process 42 is complete, draping process 44 is performed to iteratively move each point of each surface toward a reflective event. Referring now to FIG. 5, the performance of draping process 44 will now be described in detail.

Draping process 44 begins with process 48, to select a first trace T(i,j) of the survey upon which the draping is to take place in this pass of the method, where the values of indices i,j indicate the position of trace T(i,j) in the x and y surface directions in the survey. Process 50 is next performed by system computer 30, to apply filtering and other processing to the selected trace T(i,j). The filtering applied in process 50 may be of one or more conventional types, including the application of a vertical filter for the selected trace T(i,j) to remove low-frequency or high-frequency noise. Spiking deconvolution may also be performed on the selected trace T(i,j) in process 50, to compress the predictable energy from a reflection event in the time (or depth) domain, and thus to improve the resolution of the trace. Alternatively, spatial filtering may be applied in process 50, where the signal of the selected trace T(i,j) is filtered relative to neighboring traces; in this case, it may be preferable to perform filtering process 50 prior to selection process 48. Further in the alternative, filtering process 50 may wholly be eliminated if desired.

Following filtering process 50, process 52 is performed by system computer 30 to select one of the initial surfaces in process 42 for draping. For purposes of the preferred embodiment of the invention, the direction or order in which the draping occurs is not important. According to this embodiment of the invention, the draping process is performed substantially on a trace by trace basis.

Figure 6:
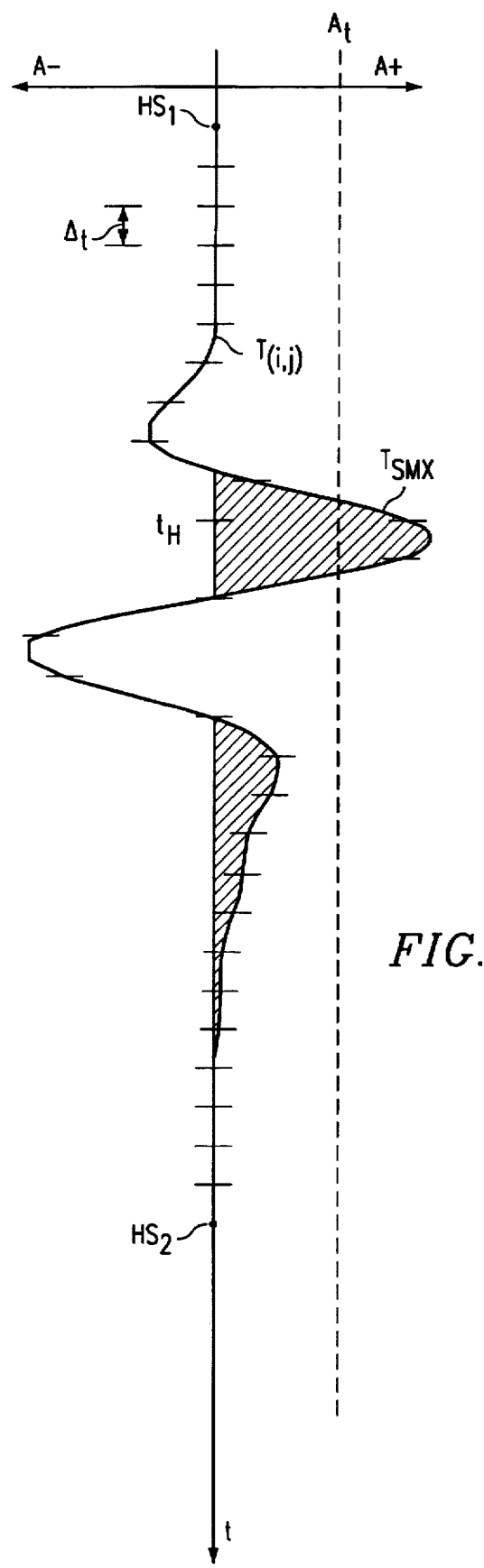
FIG. 6 is a plot of an exemplary trace illustrating the selecting of an interpreted horizon point thereupon.

A simple example of the application of process 44 to a trace is illustrated in FIG. 6, in which a selected exemplary trace T(i,j) corresponds to the amplitude of the filtered seismic signal, after common midpoint gather and stack. In the first pass of analysis process 54, point $t_p$ corresponds to initial surface $HS_1$, and is the point along trace T(i,j) from which analysis begins.

Decision 53 first determines whether the point $t_p$ is outside of an analysis range. The analysis range may be set to correspond to a time range in milliseconds, or may merely be set to be the location of the next initial surface (e.g., horizon surface $HS_2$ in FIG. 6). If point $t_p$ is outside of the analysis range (decision 53 is YES), then process 58 is next performed to null the horizon time for trace T(i,j). As will be described in further detail hereinbelow, each trace T having a null horizon time may receive a horizon time by way of interpolation, in process 66. If time point $t_p$ is still within the analysis range (decision 53 is NO), then the trace attributes are evaluated in process 54.

Process 54 is next performed by system computer 30 to determine the value of an attribute of trace T(i,j) at point $t_p$. The nature of process 54 depends upon the quantity represented by trace T(i,j), and upon the selected attribute. The attribute used in process 54 is preferably an attribute of trace T(i,j) that is useful in generating a seismic survey, such as the amplitude or phase of the energy at time $t_p$, the amplitude of the envelope of the filtered seismic signal, a generated indicator such as an amplitude-versus-offset indicator (amplitude or phase), a statistical indicator, or other known attributes useful in seismic surveys. Accordingly, process 54, in this example, evaluates the amplitude of trace T(i,j) at time $t_p$.

After such evaluation in process 54, decision 55 is performed to determine if the evaluated attribute or attributes at time $t_p$ satisfy the "draping criterion" used to identifying the horizon in trace T(i,j). The draping criterion of the selected attribute or attributes may be a maximum, a minimum, a specific value, or a range of values of the attribute. Alternatively, the draping criterion could be a defined relationship among several attributes that is useful in characterizing a reflection event. For example, the draping criterion could select a point at which the phase angle of the energy is 90°±5°, and where the amplitude is above a threshold value; if multiple points are identified that satisfy the condition, the draping criterion could be specified to select the first, last, midpoint, or maximum amplitude point as corresponding to the horizon. Alternatively, where trace T(i,j) corresponds to the combination of amplitude, frequency, and phase information, a draping criterion based upon the frequency and phase of the trace, in combination with the amplitude, may be derived.

Referring back to the simple example of FIG. 6, the draping criterion is defined simply as the point in time at the maximum amplitude of the stacked seismic signal trace T(i,j), so long as at least one sample amplitude exceeds a threshold limit $A_r$. System computer 30 thus compares the value of trace T(i,j) at time $t_p$ against amplitude threshold $A_r$ in decision 55. If the value of trace T(i,j) at time $t_p$ is below the threshold (i.e., decision 55 is NO), sample time $t_p$ is incremented in process 60 by the value $\Delta t$, and decision 53 is repeated for this next sample in time.

Upon determining, in process 54 and decision 55, that the attribute value at a point along trace T(i,j) meets the draping criterion (decision 55 is YES), process 56 is next performed by system computer 30 to set the horizon time $t_H$ for trace T(i,j) at that point. In the example of FIG. 6, where trace T(i,j) corresponds to the amplitude of the seismic signal, process 56 may be performed by merely analyzing successive sample amplitudes of trace T(i,j) until the maximum is determined; point $t_H$ would correspond to the maximum in such a case. As is evident from FIG. 6, however, while sampled point $T_{SMX}$ is the maximum sampled amplitude, it is not truly the maximum amplitude of the displayed portion of trace T(i,j). It may therefore be desirable to modify process 56 to identify the maximum amplitude more closely, for example by identifying the two maximum amplitude points and then interrogating all points within a range thereof to determine the true local maximum, within the resolution of trace T(i,j) itself. Regardless of the approach used in process 56, a horizon time $t_H$ is identified as corresponding to the position at which the interpreted horizon will be set, for the horizon corresponding to the initial surface $HS_1$ and for trace T(i,j).

Referring back to the present example, the use of a threshold determination ($A_r$) in performing process 44 is useful in dealing with traces having a weak or absent reflection signal. As is known in the art, the lack of a strong reflection signal in a seismic survey may be due to a failure in the data acquisition equipment in the field (e.g., poor coupling of receiver to the earth), or may be due to a discontinuity in the reflective formation underlying that surface location (actual or common midpoint).

Upon determination of the horizon time $t_H$ for trace T(i,j), decision 61 is performed to determine if additional horizons remain to be interpreted for trace T(i,j). If so (decision 61 is NO), process 62 advances to the next initial surface and the process is repeated from process 54 for this next horizon. Upon completion of the final horizon for trace T(i,j) (i.e., decision 61 is YES), decision 63 is performed by system computer 30 to determine whether any additional traces remain to be analyzed relative to the current selected initial surface. If so (decision 63 is NO), process 64 is performed by system computer 30 to select the next trace T(i,j) by incrementing one or both of indices i,j, and the draping is repeated for the next trace T(i,j) beginning with process 50. If no additional traces remain for analysis, control next passes to process 66 for handling of the nulled traces.

As shown in process 58 of FIG. 5, a null horizon location is set for each trace T(i,j) that has no point meeting the criteria, as indicated by the time $t_p$ being incremented until out of the analysis range without the criteria having been met. The null setting causes the interpreted horizon to have no horizon value $t_H$ for trace T(i,j). Process 66 is provided according to this preferred embodiment of the invention, to provide a well-behaved horizon for the nulled traces, if a horizon value is desired at those locations.

Figure 7:
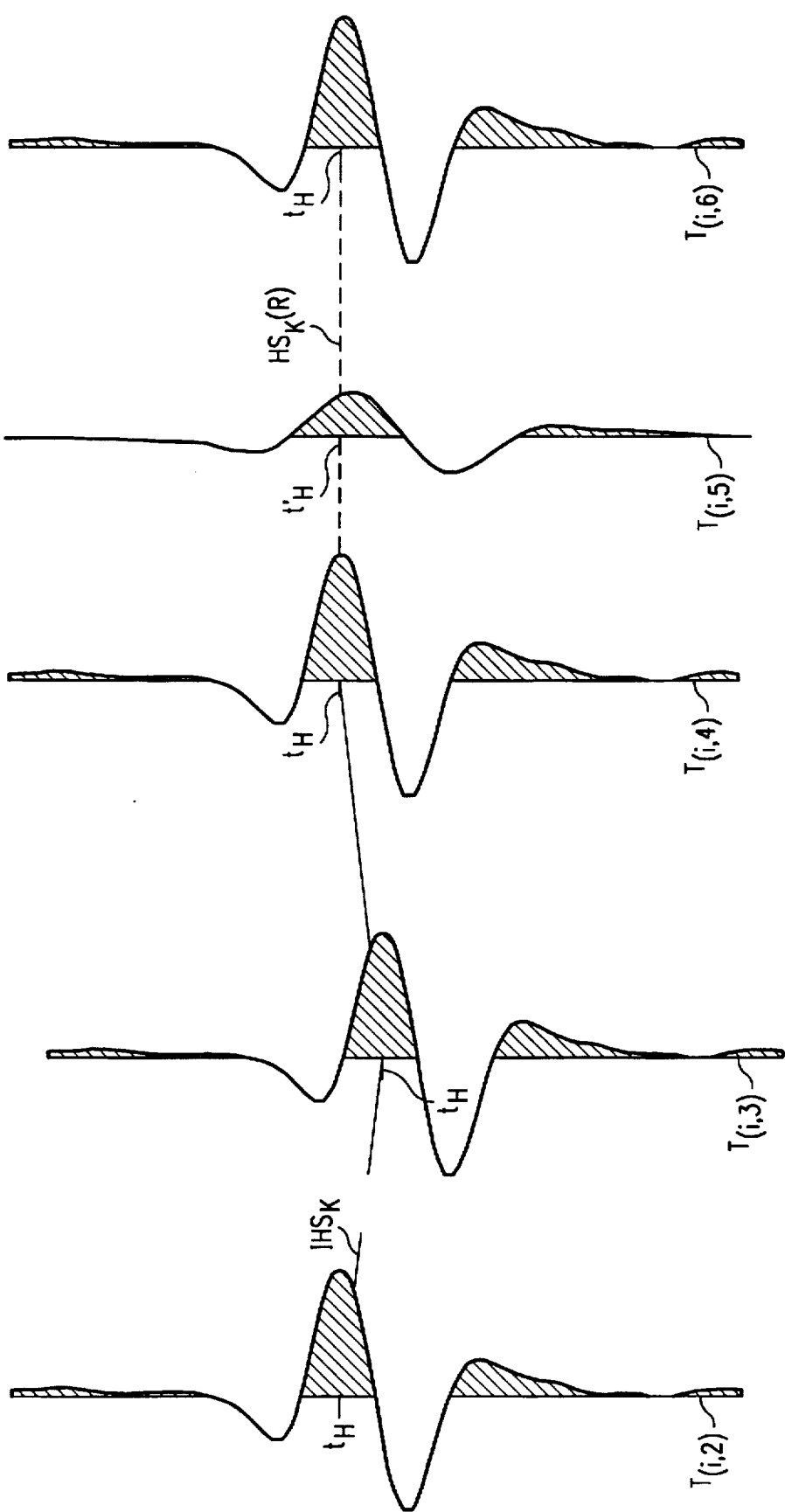
FIG. 7 is a plot of a set of exemplary traces illustrating the process of selecting an interpreted horizon point for a trace having a weak reflection signal, according to the preferred embodiment of the invention.

Attention is now directed to FIG. 7 for an example of the selection of process 58. In this example, traces T(i,2) through T(i,4) and T(i,6) all have valid horizon times $t_H$ determined by process 56, resulting in an interpreted horizon surface $IHS_k$ as shown in FIG. 7. However, in this example, trace T(i,5) has no point along its local length with an amplitude above the threshold level. As such, in the analysis of process 44 for trace T(i,4), decision 53 will continue to return a NO result until $t_p$ has been incremented or decremented by process 60 to beyond the specified analysis range, at which time decision 53 will have returned a YES result, resulting in nulling of the horizon time for this trace T(i,4) in process 58. According to this example, process 66 determines a horizon time $t_H'$ for trace T(i,5) by interpolation of the values of horizon times $t_H$ for traces T(i,4) and T(i,6) at the spatial location of trace T(i,5), defining horizon time $t_H'$ for trace T(i,5).

Of course, other techniques for deriving a horizon time $t_H'$ may be used. For example, process 66 may simply retain the null value for the current trace. Alternatively, a variety of interpolation techniques, of a selected order (linear, quadratic, cubic, etc.), may be used to determine the interpolated horizon value $t_H'$ using coplanar interpreted traces, or by using bilinear or other techniques for interpolation from interpreted horizons of traces in multiple planes.

Process 66 is repeated to perform "in-filling" of the null values for each of the nulled traces T(i,j) for each of the horizons analyzed in process 44. The in-fill process thus estimates a horizon time $t_H'$ in each trace $T(i,j)$ where no event is found within the analysis range that satisfies the draping criterion (decision 55). According to the preferred embodiment of the invention, therefore, and through use of draping criterion decision 55, range decision 53, and in-fill process 66, traces having absent or weak reflection events may be readily handled. As is evident from the foregoing description, no requirement of connected horizon surfaces is forced upon the process, but rather the interpretation of horizon times, and thus surfaces, adapt to the seismic signals of the survey. This operation makes the present method significantly more robust than conventional techniques, particularly in regions of the earth having complex geology.

Following process 66, process 44 is complete, the survey has been fully interpreted, and control passes to process 46 (shown in FIG. 2). In process 46, the results of draping process 44, as applied to the seismic survey under analysis, are directed to their appropriate and desired output device. Process 46 may include displaying, by system computer 30 onto graphics display 27, of the interpreted horizon surfaces in the form of a 2-D or 3-D seismic survey. As is known in the art, conventional seismic survey display programs allow for interactive viewing of the survey, in a particular direction or relative to a selected "slice", or in a perspective view.

Figure 3B:
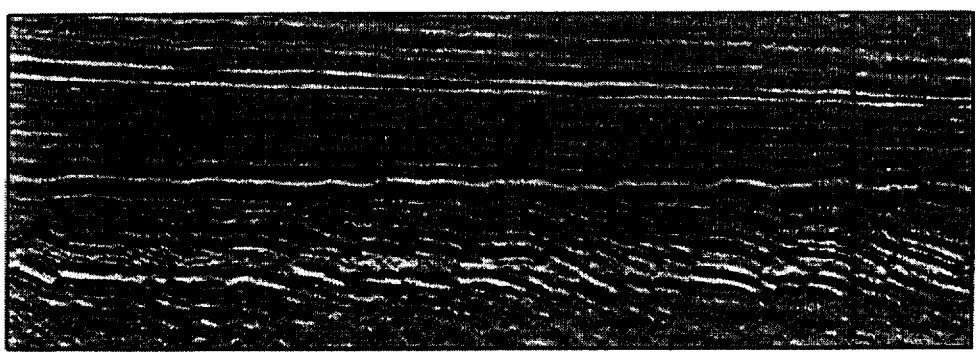
Figure 4B:
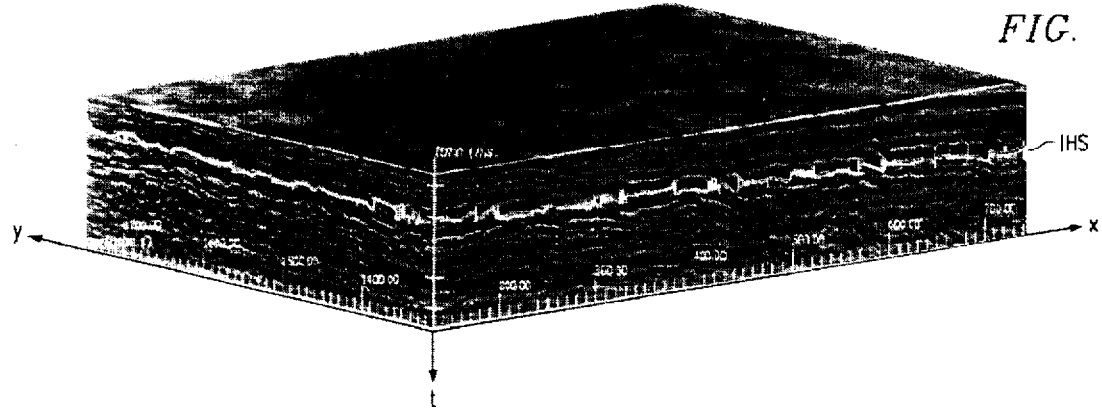

FIG. 3b is an example of a 2-D "slice" of the survey corresponding to FIG. 3a, and displayed by process 46, in which the initial surface HL has been draped, through the operation of process 44, over the traces so as to produce an interpreted horizon line IHL (which may be part of an interpreted surface) as shown. FIG. 4b illustrates another example of the output of process 46 as generated by system computer 30, showing a perspective view of the 3-D survey corresponding to FIG. 4a, in which the initial surface HS has been draped, through the operation of process 44, over the traces in the survey to produce an interpreted horizon surface IHS as shown in FIG. 4b. In each of these examples, the draping of the initial surfaces to suspected reflection events in the seismic survey is evident.

Alternatively, or in combination, output process 46 may be performed by system computer 30 storing, in disk storage device 29, the identity and locations of the interpreted horizon surfaces produced by process 44, for later use with conventional seismic survey tools. For example, the horizons as interpreted by this embodiment of the invention may be "tied" to, or rationalized with, other information regarding the geology in the survey region, such as that obtained from conventional well logs. Other conventional survey generation and interpretation techniques may also, or alternatively, use the results stored in process 46 in the generation of seismic survey output.

Further in the alternative, the result stored in disk storage device 29 in process 46 may be applied recursively, as an initial surface, to another pass through the interpretation process described hereinabove. For example, the uppermost horizon surface may be draped as described hereinabove, and the results of this draping may both be stored (as the uppermost interpreted horizon) and also used as the initial surface for the next deeper reflection horizon.

Through use of the above-described invention, it is contemplated that the interpretation of reflection horizons will be made much more efficient that available with conventional techniques. This improved efficiency will be obtained even for surveys in regions of complex geologies, and for surveys with large numbers of data points. It is therefore contemplated that the use of automated seismic interpretation generation will become even more widely applicable to difficult and sizable surveys, and will also be more robust when applied to previously acquired seismic signals.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of operating a computer to interpret seismic survey signals to identify geological formations in a region of the earth corresponding to the seismic survey signals, wherein the seismic survey signals comprise time-based signals obtained by detectors at the earth responsive to seismic energy imparted to the earth and reflected from geological formations, the method comprising the steps of:

retrieving digital data from memory corresponding to the seismic survey signals, and arranged as a plurality of traces, each trace associated with a surface location of the survey and representative of a plurality of values of at least one attribute along a depth-related dimension;

displaying the plurality of traces as a survey representation;

receiving inputs corresponding to a first initial surface in the survey representation;

for each of the plurality of traces, evaluating the attribute at a plurality of points in the depth-related dimension near the first initial surface relative to a selected draping criterion;

responsive to the evaluated attribute at one of the plurality of points meeting the draping criterion, setting a first interpreted horizon point along the depth-related dimension for each of the plurality of traces; and outputting an interpreted survey representation including the first interpreted horizon points for each of the plurality of traces.

2. The method of claim 1, wherein the outputting step comprises displaying the interpreted survey representation on a graphics display.

3. The method of claim 1, wherein the outputting step comprises storing the interpreted survey representation in memory.

4. The method of claim 3, further comprising:

retrieving the interpreted survey representation from memory;

applying the first interpreted horizon points as a second initial surface in the survey representation;

for each of the plurality of traces, evaluating the attribute at a plurality of points in the depth-related dimension near the second initial surface relative to the draping criterion;

responsive to the evaluated attribute at one of the plurality of points meeting the draping criterion, setting a second interpreted horizon point along the depth-related dimension for each of the plurality of traces; and outputting an interpreted survey representation including the second interpreted horizon points for each of the plurality of traces.

5. The method of claim 1, wherein the selected draping criterion comprises a maximum value of the attribute;

and wherein the step of setting a first interpreted horizon point along the depth-related dimension for each of the plurality of traces comprises:

determining a maximum value of the attribute over a selected range in the depth-related dimension; and identifying the point in the depth-related dimension corresponding to the maximum value of the attribute as the first interpreted horizon point.

6. The method of claim 5, wherein the step of determining a maximum value comprises:

evaluating the attribute at a plurality of sample points in the depth-related dimension.

7. The method of claim 1, wherein the selected draping criterion comprises a threshold value;

and wherein the step of setting a first interpreted horizon point along the depth-related dimension for each of the plurality of traces comprises:

evaluating the attribute at a plurality of sample points over a selected range in the depth-related dimension;

comparing values of the attribute determined in the evaluating step to the threshold value;

responsive to one of the values of the attribute determined in the evaluating step exceeding the threshold value, determining a maximum value of the survey attribute over the selected range in the depth-related dimension and identifying the point in the depth-related dimension corresponding to the maximum value of the survey attribute as the first interpreted horizon point.

8. The method of claim 7, further comprising:

responsive to none of the values of the attribute determined in the evaluating step exceeding the threshold value, setting a null value as the first interpreted horizon point.

9. The method of claim 7, further comprising:

responsive to none of the values of the survey attribute determined in the evaluating step exceeding the threshold value in a first trace, deriving the first interpreted horizon point for the first trace using a previously interpreted first interpreted horizon point for a second trace.

10. The method of claim 1, further comprising:

receiving inputs corresponding to a second initial surface in the survey representation;

for each of the plurality of traces, evaluating the attribute at a plurality of points in the depth-related dimension near the second initial surface; and responsive to the evaluated attribute at one of the plurality of points meeting the draping criterion, setting a second interpreted horizon point along the depth-related dimension for each of the plurality of traces;

wherein the outputting step outputs an interpreted survey representation including the first and second interpreted horizon points for each of the plurality of traces.

11. The method of claim 1, wherein the depth-related dimension corresponds to the dimension of time.

12. The method of claim 1, wherein the depth-related dimension corresponds to the dimension of depth into the earth.

13. The method of claim 1, wherein the plurality of traces corresponds to a line of a seismic survey.

14. The method of claim 1, wherein the plurality of traces corresponds to a two-dimensional array of locations in a seismic survey.

15. The method of claim 14, wherein the step of receiving inputs corresponding to a first initial surface comprises:

receiving user inputs indicating a point along each of a plurality of traces in intersecting planes of the survey representation; and deriving the first initial surface as a surface including the points indicated in the step of receiving user inputs.

16. A digital computing system for analyzing seismic survey signals to interpret reflective horizons in a survey of a region of the earth corresponding to the seismic survey signals, comprising:

a memory for storing data corresponding to a plurality of series of seismic signals obtained at a plurality of detectors at the earth responsive to seismic energy imparted to the earth and reflected from depth points below a corresponding surface location;

a graphics display output device;

a user input device; and a programmed computer, coupled to the memory and to the graphics display output device, for:

retrieving digital data from the memory corresponding to the seismic survey signals, and arranged as a plurality of traces, each trace associated with a surface location of the survey and representative of a plurality of values of at least one survey attribute along a depth-related dimension;

displaying the plurality of traces on the graphics display output device as a survey representation;

receiving inputs via the user input device corresponding to a first initial surface in the survey representation;

for each of the plurality of traces, evaluating the survey attribute at a plurality of points in the depth-related dimension near the first initial surface relative to a selected draping criterion;

responsive to the evaluated survey attribute at one of the plurality of points meeting the draping criterion, setting a first interpreted horizon point along the depth-related dimension for each of the plurality of traces; and outputting, on the graphics display device, an interpreted survey representation including the first interpreted horizon points for each of the plurality of traces.

17. The system of claim 16, wherein the computer is for setting the first interpreted horizon point along the depth-related dimension for each of the plurality of traces by:

determining a maximum value of the survey attribute over a selected range in the depth-related dimension, the selected draping criterion comprising the maximum of the attribute; and identifying the point in the depth-related dimension corresponding to the maximum value of the survey attribute as the first interpreted horizon point.

18. The system of claim 16, wherein the computer is for setting the first interpreted horizon point along the depth-related dimension for each of the plurality of traces by:

evaluating the survey attribute at a plurality of sample points over a selected range in the depth-related dimension;

comparing values of the survey attribute determined in the evaluating step to a threshold value;

responsive to one of the values of the survey attribute determined in the evaluating step exceeding the threshold value, the selected draping criterion comprising the threshold value, determining a maximum value of the survey attribute over the selected range in the depth-related dimension and identifying the point in the depth-related dimension corresponding to the maximum value of the survey attribute as the first interpreted horizon point.

19. The system of claim 16, wherein the computer is for setting the first interpreted horizon point along the depth-related dimension for each of the plurality of traces also by:

responsive to none of the values of the survey attribute determined in the evaluating step meeting the draping criterion in a first trace, deriving the first interpreted horizon point for the first trace using a previously interpreted first interpreted horizon point for a second trace.

* * * * *